P. A. JOHNSON.
CULTIVATING MACHINE.
APPLICATION FILED MAY 9, 1913.
1,088,075.
Patented Feb. 24, 1914.
2 SHEETS—SHEET 2.
Fig. 3
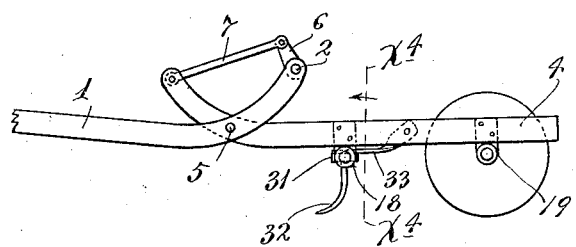
Fig. 4
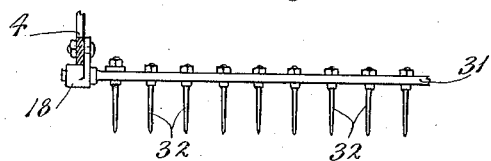
Fig. 5
Fig. 6
Witnesses.
A. H. Opsahl.
E. C. Skinkle
Inventor.
Peter A Johnson
By his Attorneys
Williamson & Merchant

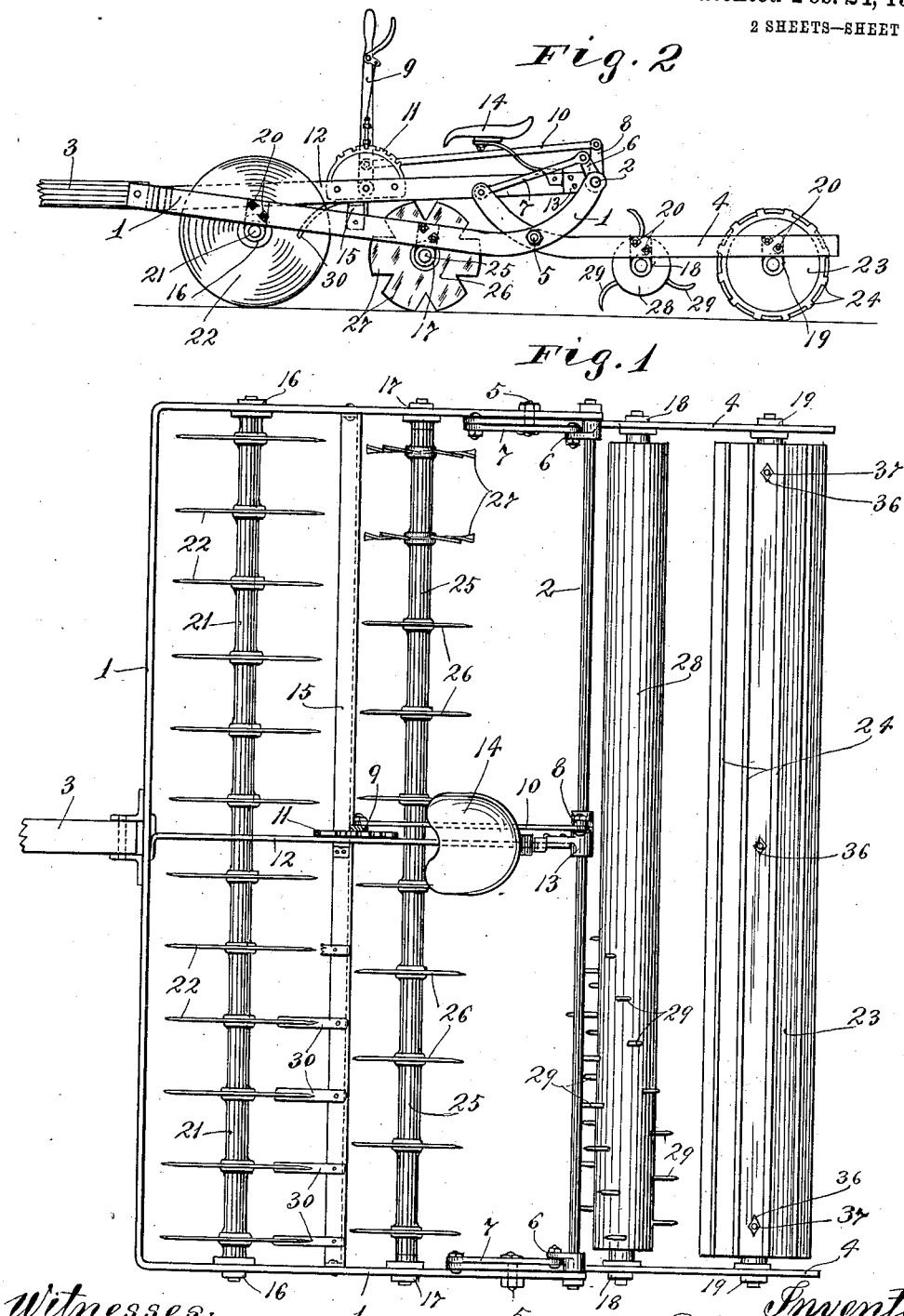

UNITED STATES PATENT OFFICE.

PETER A. JOHNSON, OF MINNEAPOLIS, MINNESOTA.

CULTIVATING-MACHINE.

1,088,075.　　　　　Specification of Letters Patent.　　Patented Feb. 24, 1914.

Application filed May 9, 1913.　Serial No. 766,515.

*To all whom it may concern:*

Be it known that I, PETER A. JOHNSON, a citizen of the United States, residing at Minneapolis, in the county of Hennepin and State of Minnesota, have invented certain new and useful Improvements in Cultivating-Machines; and I do hereby declare the following to be a full, clear, and exact description of the invention, such as will enable others skilled in the art to which it appertains to make and use the same.

My invention relates to improvements in cultivating machines and, to this end, it consists of the novel devices and combinations of devices hereinafter described and defined in the claims.

In the accompanying drawings, which illustrate the invention, like characters indicate like parts throughout the several views.

Referring to the drawings: Figure 1 is a plan view of the improved cultivating machine, some parts being removed and some parts being broken away; Fig. 2 is a side elevation of the same; Fig. 3 is a side elevation of the rear portion of the frame of the improved cultivating machine, as illustrated in Fig. 2, with the exception that a harrow-tooth equipped bar is substituted for the rotary harrow; Fig. 4 is a view of the harrow-tooth equipped bar in rear elevation, the supplemental frame being shown in section on the line $x^4$ $x^4$ of Fig. 3; Fig. 5 is a plan view of the parts shown in Fig. 4; and Fig. 6 is a view in transverse section taken through one of the interchangeable bars having secured thereto a spring harrow-tooth.

The numeral 1 indicates a substantially horizontally extended skeleton main frame comprising connected front and side bars, said side bars having their rearwardly projecting ends curved upwardly and connected by a rock shaft 2, journaled therein. Secured to the intermediate portion of the front bar of the frame 1 is a forwardly projecting pole 3, to which the draft animals may be attached.

A supplemental frame forming a rear extension of the main frame 1 comprises a pair of substantially horizontally extended side bars or levers 4, having their forward ends curved upwardly. The curved ends of the side bars of the main and supplemental frames are overlapped and pivotally and detachably connected by nut equipped bolts 5. Rigidly secured to each end of the rock shaft 2 is a pair of crank arms 6 pivotally connected to the front ends of the supplemental frame 4 by links 7. An intermediate crank arm 8 is also rigidly secured to the rock shaft 2 and is connected to the intermediate portion of a latch lever 9, by a long link 10. The lower or short end of the latch lever 9 and coöperating segment 11 are mounted on a longitudinally extended tie bar 12 which is secured, at its forward end, to the front bar of the main frame 1. At its rear end, the tie bar 12 is provided with a bearing 13 in which is journaled the intermediate portion of the rock shaft 2. A spring supported seat 14 is located just back of the latch lever 9 and secured to the tie bar 12. The side bars of the main frame 1 are connected by a horizontally extended tie bar 15, rigidly secured to the tie bar 12.

To the side bars of the main frame 1 are secured transversely alined pairs of front and rear bearings 16 and 17, respectively, and to the supplemental frame 4 are secured transversely alined pairs of front and rear bearings 18 and 19, respectively. All of the bearings 16 to 19 inclusive are detachably and removably secured to the frames 1 and 4, by nut equipped bolts 20, the purpose of which will presently appear. Journaled in the bearings 16 is a horizontally extended shaft 21, equipped with laterally spaced cutting disks 22 which also afford support for the front portion of the main frame 1. A horizontally extended roller 23 is equipped with trunnions journaled in the bearings 19. This roller 23 has longitudinally extended peripheral ribs 24 and supports the rear end portion of the supplemental frame 4. Extending parallel to the shaft 21 and journaled in the bearings 17 is a shaft 25, equipped with a plurality of laterally spaced serrated disks 26 having oblique blades 27. The trunnions of a drum 28 are journaled in the bearings 18 and said drum is provided with a plurality of spirally arranged rearwardly curved teeth 29, said drum and teeth constituting a rotary harrow.

Obviously, by operating the latch lever 9, the connected portions of the main and supplemental frames may be raised or lowered, at will, according to the depth to which the blades 27 and teeth 29 are to be set. Each disk 22 is provided with a bifurcated scraper blade 30 secured to the tie bar 15, the prongs of which embrace the disk 22 and scrape the sides thereof. All of the ground working tools mounted on the main and supplemental frames are interchangeable and demountable. By removing the bearings 16 to 19 inclusive on one side of the machine, the ground working tools may be readily removed from said frames. In Fig. 3 is shown a harrow-tooth equipped bar 31, mounted in the bearings 18 in place of the rotary harrow shown in Figs. 1 and 2. As best shown in Figs. 3 and 5, the harrow teeth 32 are curved forwardly and downwardly and the bar 31 is held against rotation in the bearings 18 by a bracket 33, rigidly secured to said bar and the adjacent side of the supplemental frame 4. In Fig. 6 is shown a bar 34 equipped with a spring harrow-tooth 35. The improved cultivator, as shown in Figs. 1 and 2, is arranged for preparing the ground to plant corn, and the roller 23 is provided with corn hill markers 36 in the form of stars, detachably secured to the periphery of the roller 23 by screws 37.

The action of the improved machine, as shown in Figs. 1 and 2, may be briefly stated as follows: The disk 22 will cut the soil, sod and corn stalks, and the oblique blades of the disks 26, which follow the disk 22, will disintegrate and pulverize the soil. The rotary harrow 28 following the disk 26 will further disintegrate and smooth the surface of the soil. The roller 23 will then press down the soil and the corn markers 34 will indicate where the corn is to be planted. The ribs 24 of the roller 23 form depressions or corrugations in the ground, for the well known purpose of preventing the blowing or drifting of the top soil.

Obviously, by making the ground tools interchangeable and demountable, the machine is adapted for different kinds of work. It is also evident that the supplemental frame may be entirely removed and the main frame used with such ground tools as may be required for any certain work.

The above described machine is thought to be efficient for the purpose had in view.

What I claim is:

1. In a machine of the kind described, the combination with a main frame, of a supplemental frame comprising a pair of levers forming rear extensions of the sides of said main frame and pivotally connected thereto, the connected ends of said levers and the sides of said main frame being extended above their pivotal connections, crank arms and links connecting the upwardly projecting ends of said levers and the sides of said main frame, a coöperating latch lever and segment for controlling said crank arm, and ground working tools mounted on said two frames.

2. In a machine of the kind described, the combination with a main frame comprising front and side bars, of a supplemental frame comprising a pair of levers forming rear extensions of the side bars of said main frame and pivotally connected thereto, the connected ends of said levers and side bars being extended above their pivotal connections, a crank-equipped rock shaft and links connecting the upwardly projecting ends of said levers and side bars, a coöperating latch lever and segment for controlling said rock shaft, and ground working tools mounted on said two frames.

In testimony whereof I affix my signature in presence of two witnesses.

PETER A. JOHNSON.

Witnesses:
  EDITH E. HANNA,
  HARRY D. KILGORE.

---

Copies of this patent may be obtained for five cents each, by addressing the "Commissioner of Patents. Washington, D. C."